Oct. 30, 1928.
L. SERRA
1,689,754
BEARING DEVICE FOR RAILS ON SLEEPERS OF REENFORCED CEMENT
Filed April 19, 1927
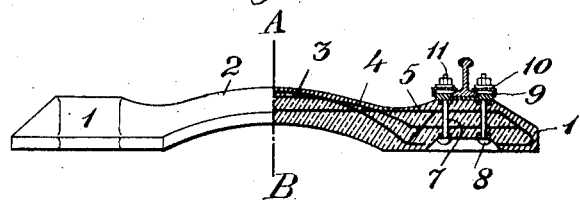
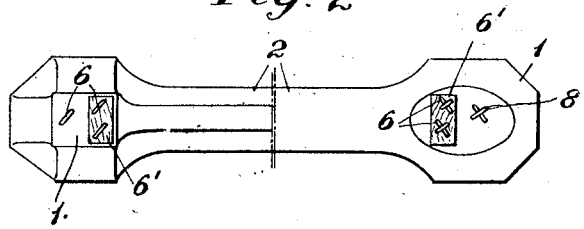
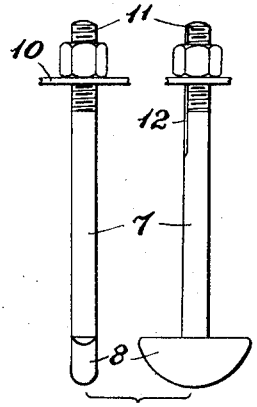
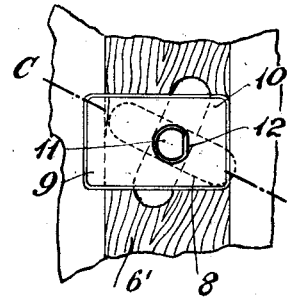
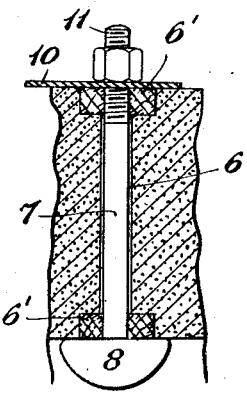
Luigi Serra
INVENTOR
By [signature]
his Attorney Patented Oct. 30, 1928.

1,689,754

UNITED STATES PATENT OFFICE.

LUIGI SERRA, OF ROME, ITALY.

BEARING DEVICE FOR RAILS ON SLEEPERS OF REENFORCED CEMENT.

Application filed April 19, 1927, Serial No. 184,942, and in Italy December 22, 1926.

Sleepers of reenforced cement for rails as hitherto used, owing to certain structural defects, have given no good results.

Reenforced cement has very little elasticity and is subjected to breakage under the action of sudden overloads and shocks capable of producing combined tension and flection stresses.

On the other hand the use of wood and iron sleepers owing to the high cost of material has become all but prohibitive, and cheaper materials must be resorted to provided they fulfil the general requirements as to resistance and static conditions.

My present invention has for its object to provide a bearing device for rails on sleepers of reenforced cement comprising two support blocks connected together by an arc-like member, the latter and the support blocks being interconnected by the inner metallic structure forming the reenforcement of the cement sleeper.

In order that my said invention may be more clearly understood I have illustrated same by way of example in one of its modifications in the annexed drawings in which Fig. 1 is a partially sectioned elevation of my improved rail bearing device;

Fig. 2 shows on the left a plan view of the corresponding part in Fig. 1, and on the right an under plan view of corresponding part of Fig. 1;

Fig. 3 is a section on line A—B of Fig. 1;

Fig. 4 a detail view of the anchorage of the rails;

Fig. 5 a detail view of the anchor bolt and

Fig. 6 a section on line C—D of Fig. 4.

Corresponding reference numerals throughout the drawings indicate corresponding parts.

1 is the block proper, supporting the rail on the sleeper, preferably recessed at the bottom so as to be able to accommodate the heads of the anchor bolts and obtain the best connection to the mass of the block.

2 is the arcuate bridgelike tie or link between blocks 1, 1₁, whilst 3, 4, 5 are the iron bars forming the common reenforcement of blocks and connecting bridge 2. Holes 6 provided with a suitable metal lining are designed for passage and adjustment of fixing bolts with respect to the rails. 7 is the shaft of the bolts. 8 are the bottom heads of bolts, so shaped as to be capable of being inserted from above through holes 6. Said holes have bushes 6¹ at their ends fixed to the cement mass and slightly projecting therefrom in order to protect against wear the bearing part of the usual covering plate on the assembly. 9 is the plate for keeping the rail and covering plate on block 1, and has on the passage for the bolt a tooth engaging with a groove on the screw-threaded part of the bolt. 10 is a roughened metallic washer serving as an elastic intermediate member for taking up the vibrations, interposed between plate 9 and the hexagonal or quadrangular lock screw. 11 is the threaded part of the bolt and 12 the groove therein with which the tooth of plate 9 engages.

In the modification shown three holes 6 are indicated by way of example in each bearing block or support, parallel to each other, and inclined as shown, so as to permit adjustment of the rail and in order to adjust the gauge, and also to cause the component of force to which the bolt is subjected to act in an approximately perpendicular direction to the maximum dimension of the hole. In the modification shown the reenforcing skeleton of the cement structure comprises an iron rod embracing the interior of the bottom circumference of the block, then bending and rising to approximately reach the top in the central portion of bridge 2, and continued symmetrically for the other block. Similarly the inner circumference of the upper part of the block is embraced by a reenforcing iron rod which in the bridge part 2 is bent downwards so as to be situated in the lowest part of the center of bridge part 2. Furthermore another reenforcing iron rod is placed half-way the height of the block and runs horizontally in order to ensure invariability of gauge. The various parts of reenforcement, of course, are connected together by suitable bows.

The sleeper placed in its whole length on the ballast or road bed very soon after having been put in place finds itself in the same condition as a solid body subjected to flection stress which is supported under the rails and subjected to stress in the center line by a dynamic load from the axle of the engine passing with great velocity. Thus shocks and stresses act violently on the sleeper, and the reenforced cement structure being rigid does not react well to such violent stresses, and therefore all of the different types of cement sleepers hitherto used have given bad results.

By my present invention founded on new principles a bearing device for rails is provided which though keeping within the narrowest limits of dimensions allowed by practice obviates the very serious drawbacks which hitherto made the use of reenforced cement for sleepers all but impossible.

Tests made with a specimen built for the purpose, comprising two rigid blocks connected together by a plastic member have proved that the said connecting member under the continued stress of passing trains gradually took an arcuate shape which finally became permanent after repeated tests. A series of observations made on the connecting member and its satisfactory arcuated shape have led to adopting the said arcuate shape resulting from experience as a standard type of sleeper according to the invention as shown in the drawings in which a bearing member for the rails is obtained in which flection stresses are absolutely eliminated, as it may be placed advantageously in position without the central portion being in contact with the roadbed. It would even be preferable to provide along the axis of the track a depression in the roadbed which besides disposing more readily of the water would also be a material economy in graveling and maintenance.

Having now particularly described and ascertained the nature of my said invention and in what manner the same is to be performed I declare that what I claim is:

1. A railway tie of reenforced cement, comprising oppositely arranged blocks and an arched bridge connecting said blocks, each of said blocks having a lower concave face with depressions in its upper and lower faces, a bushing in each depression, and each block having a plurality of bolt slots therethrough, certain of said slots being adjacent the inner side of the block and others adjacent the outer side of the block, each of said slots being disposed at an angle to both the longitudinal and transverse axes of the tie.

2. A railway tie of reenforced cement, comprising as an integral structure a pair of terminal blocks and an intermediate arched bridge, each of said blocks having inclined oblong bolt holes therethrough, said bolt holes being disposed at an angle of 10° with respect to the direction of the rail and arranged two near one side of the block and one near the other side thereof, each of said blocks having a lower concave face with depressions in its upper and lower faces, and bushings in said depressions.

In testimony whereof I have hereunto signed my name.

LUIGI SERRA.